Oct. 15, 1940.  E. H. BOBO  2,217,789
FISH LURE
Filed Dec. 9, 1937
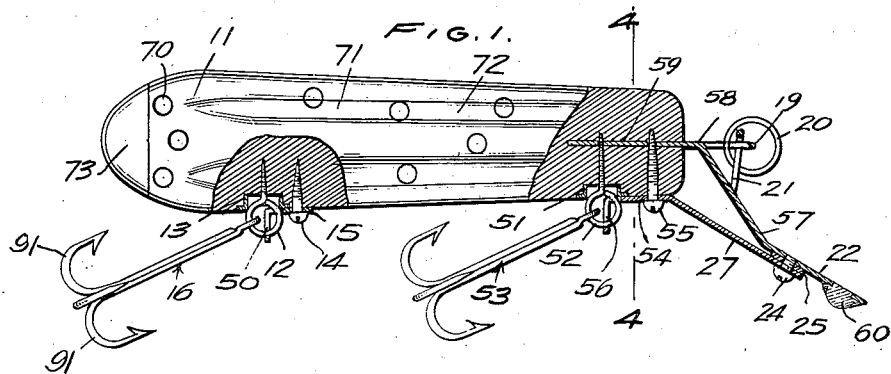
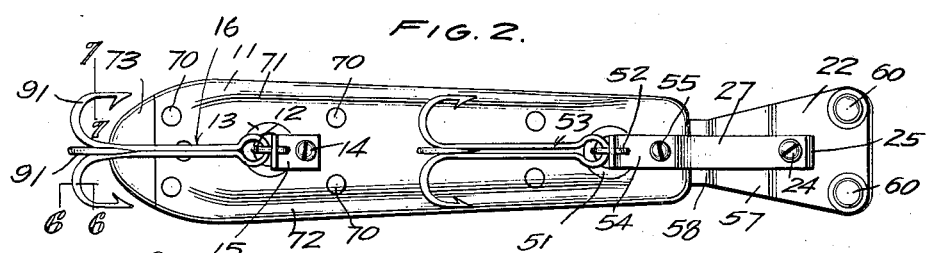
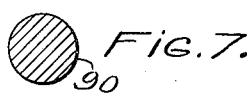
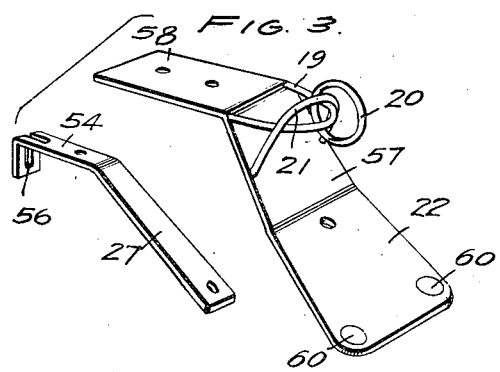
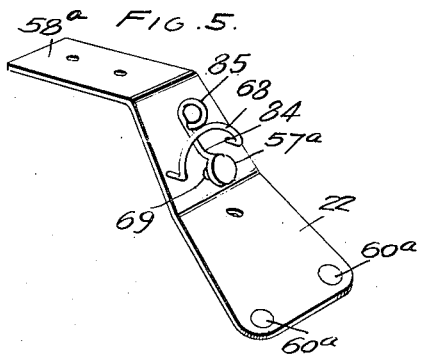
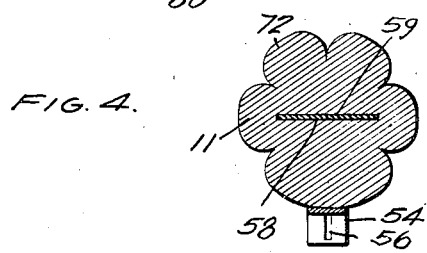
EDWARD H. BOBO
INVENTOR.
BY C. A. Snow & Co.
ATTORNEYS.

Patented Oct. 15, 1940

2,217,789

UNITED STATES PATENT OFFICE 2,217,789

FISH LURE

Edward H. Bobo, Ranger, Tex.

Application December 9, 1937, Serial No. 178,991

5 Claims. (Cl. 43—28)

The device forming the subject matter of this application is a fishing lure, and one object of the invention is to improve the automatically acting hitch between the ring that is attached to the towing or fishing line, and the body of the lure. Another object of the invention is to provide novel means for mounting the hooks. A further object of the invention is to strengthen and improve the device generally.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in side elevation, a device constructed in accordance with the invention, parts being broken away;

Fig. 2 is a bottom plan;

Fig. 3 is a fragmental perspective showing certain parts of the device;

Fig. 4 is a transverse section on the line 4—4 of Fig. 1;

Fig. 5 is a perspective view showing a modification.

Fig. 6 is a transverse section of the bend of the hook, on the line 6—6 of Fig. 1;

Fig. 7 is a transverse section of one member of the shank of the hook.

In carrying out the invention, there is provided a body 11, of any desired form, but conventionalized to such an extent that, generally stated, it is of the elongated form shown in the drawings. The body may be made of any suitable material, for instance wood.

The finish for the body 11 may comprise one or more coats of clear shellac, followed by design coatings of colored shellac, retaining reflecting pieces 70, of any desired pattern, and preferably made of brilliant metal foil, the whole structure being given one or more coats of lacquer, either clear or chromated.

The body 11 is provided with longitudinal grooves 71, defining transversely convexed ribs 72, which decrease head resistance, but maintain an undiminished lateral resistance, a decrease of head resistance being beneficial to a darting lure of this type, and the undiminished lateral resistance being desirable to impart to the lure, a short wriggling motion. The rear end of the body 11 approaches a semi-spherical form, and to it is secured a reflector 73, preferably made of metal foil, and giving a wide angle of reflection at the rear end of the body.

In the bottom of the rear portion of the body 11 is seated a flanged thimble 13. A screw eye 12 is threaded into the body 11, and the head of the screw eye engages the thimble 13 and holds the thimble in place in the body. An angle bracket or retainer 15 is attached to the body 11 by a securing element 14, such as a screw, and the depending flange of the angle bracket is provided with a slot or seat 50, which receives the head of the screw eye 12 and prevents the screw from threading out of the body 11. To the head of the screw eye 12, a rear hook 16 is pivoted, and the depending flange of the angle bracket serves as a stop limiting the movement of the hook 16 and preventing the hook from locking or cocking.

Whether the hook 16 is of the gang variety shown, or otherwise constructed, the single shank thereof, or each element of the multipart shank disclosed, is of circular cross section, as shown at 90 in Fig. 7, whereas the bend 91 of the hook is of approximately oval cross section, as shown at 92 in Fig. 6, the construction giving increased strength with no increase in the size of the barb of the hook, a better penetration resulting.

At the bottom of the body 11, near to the forward end thereof, there is a set of parts substantially duplicating those described. The description, therefore, may be reduced to a mere catalogue of parts, wherein are mentioned the flanged thimble 51, the screw eye 52 carrying the front hook 53, and the angle bracket 54, held in place by a securing element 55 and provided with a slot or seat 56 for the reception of the head of the screw eye 52. The angle bracket 54 has a depending forwardly and downwardly inclined brace 27, the screw eye 52 and the securing element 55 affording a double anchorage for the angle bracket and the brace.

The numeral 22 marks a plate-like member disposed parallel to the brace 27 and increasing in width as it extends forwardly. To the member 22 is secured a small block 25, which serves to give increased anchorage for a securing element or screw 24, the screw attaching the forward end of the brace 27 to the part 22. The member 22 has an upwardly extended, obtusely disposed portion 57, merging into a rearwardly extended and obtusely disposed foot 58, received in a slot 59 in the forward end of the body 11, and held therein by the securing element 55 and the screw eye 52.

Near to its forward end, the member 22 is provided with eyes 60, extended through the member 22, and made of glass or some equivalent substance, either transparent or translucent. The eyes 60 differ from the conventional eyes, in that light may pass through them, whereas the ordinary eye merely reflects the light which it receives. The advantage of the eye structure of the present case is that it gives a clearer, brighter and more natural representation of an eye than do the eyes commonly in use.

Having thus described the parts which are of importance, but not of prime importance, a major feature of the invention, to wit the shiftable hitch, now will be discussed. This portion of the device provides means for automatically shifting the hitch or point of attachment to the towing line, and for causing said point to return to its original position. In the ordinary construction, the point of attachment for the line is fixed, and generally is located in or close to the axis of the body 11. The conventional type of lure is structurally balanced laterally about a point of attachment that lies either in, above or below the longitudinal axis of the body, and any permanent deviation from this construction will retard or destroy the action of the lure. Theoretically, a lure of the type under discussion should retrieve without lateral motion, due to lateral balance, but, unlike eddy currents that are set up, make unequal pressures arise, which create motion that is magnified until a maximum is reached, typical of the specific lure.

In the lure forming the subject matter of this application, provision is made for lateral displacement of the point of tow-line attachment, to take place automatically, but under control as structural features are changed. An approximately semi-circular first bracket 19 is attached to the front end of the foot 58 of the member 57—22, and is disposed parallel to the longitudinal axis of the body 11, in a normally horizontal position, although slight variations in position are permissible. An approximately semicircular second bracket 21 is secured to the part 57 of the member 22, at proper angle to the bracket 19, and the bends of the brackets cross, at the sides thereof.

On the brackets 19 and 21, a ring 20 is mounted for lateral sliding movement. The function of the bracket 21 is to control the amplitude of lateral displacement of the ring 20. The top of the bracket 21 is slightly above the front portion of the bracket 19, and in such position that the ring 20 does not engage it at this point, thus leaving a portion of the front of the bracket 19 where the ring 20 may slide unhindered by the bow or bracket 21. The extent of this portion is optional, but somewhat limited.

In the lure forming the subject matter of this invention, the same starting forces enter into its lateral motion as occur in similar forms, since the ring 20 is substantially in contact with the central portion of the bow 19 at the beginning of the retrieve, but any lateral or yawing motion of the lure will cause the ring 20 to be displaced from this centrally located portion of the bow 19. Any lateral movement of the ring 20, however, has a component lengthwise of the body 11 of the lure, and rearwardly, the ring 20 being considered as part of the towing or fishing line (not shown) to which the ring is attached, the point of attachment being the point where the ring 20 is in contact with the bow or bracket 19. The rearward shift of the ring 20 would be equivalent to a forward shift of the bracket 19 and the body 11 of the lure, but such a forward shift is physically impossible, so long as the longitudinal axis of the body 11 lies in a horizontal plane; but this condition is changed so soon as the retrieve is started. The lure then assumes a balanced position about the parts 19 and 20, and is so disposed that the forward end of the body 11 is downward, and the rear end of the body is upward, with respect to a horizontal plane, and to the extent that an imaginary line from the end of the fishing rod to the center of curvature of the bow or bracket 19 will be perpendicular to the plane of the bow 19 at that point.

It will be seen that the path of the ring 20 and the fishing line, when moved around the bow 19, will create half of a right cone, the base of which is the bow or bracket 19, the apex of the cone being the point where the fish line enters the line guide on the fishing rod. The result is that the ring 20 may move freely about and upon the bow or bracket 19, with no relative change in distance between the lure proper, the bow or bracket 19 and the end of the fishing rod; yet the effect is the same as though the point of attachment had been shifted rearwardly, as will be made manifest in view of certain remarks hereinafter respecting the bow 21.

It should be carried in mind that the member 57—22 generally is set at an angle to the body 11, and that the placement is such as to cause the lure to dive, and that should the lure be turned or rotated about its longitudinal axis, this same principle will cause it to slice away from a straight course. For example, if the ring 20 has shifted in position to the right of the central portion of the bow 19, there is set up a new pivotal point, and a new longitudinal axis, with a lesser surface to the right, and a greater surface to the left of this new pivotal point and axis, when considered in top plan. This difference in surfaces likewise will cause a distinct difference in pressures on opposite sides of the new axis, and will cause the lure to rise on the side of lesser pressure, and to sag on the side of the greater pressure. Thus there is brought about a partial rotation of the body 11, as has been intimated hereinbefore, and the lure will tend to slice or yaw away from a true course. This slicing and rotation will continue until the lure will reach the surface of the water and become inoperative, saving for the action of the bow 21 and the lateral drag of the fish line, as will be explained hereinafter.

The shift of the pivotal point laterally has also shifted this point rearwardly, which will upset the balance of the body 11, which the lure had formerly sought, forwardly and rearwardly with respect to the piovtal point. The forward position will have an unbalanced pressure upon it, and will dip, causing the bow 21 to rock or rotate forwardly until it comes into contact with the ring 20, and ultimately the bow 19 will be lifted from the ring 20. It should be noted, however, that the ring 20 and the bow 21 are beyond the critical angle of friction at the point of contact, and the ring 20 starts to move toward the central portion of the bow 21. The ring 20 immediately comes into contact with the bow or bracket 19, but starting friction has been overcome, and the ring continues to move until it has reached and generally overshot the central portions of the bows 19 and 21, and, likewise, has crossed the longitudinal axis of the lure. Here a similar operation ensues, as has been above described, the lure, however, being rotated and caused to slice in the opposite direction. The drag on the submerged portion of the fish line always assists the ring 20 to recover from displacement and the drag naturally is in the opposite direction to that in which the lure slices, this slicing being always in the same direction as the displacement of the ring 20.

A plan view of the path or track of the lure will be of sinuous or snake-like form, with very sharp curves at the outer limits, in comparison with the curves at the inner limits. There is also a dipping motion, followed by a rising motion, as the lure swings between the limits, a three-dimensional track resulting. This feature is a decided advantage over a two-dimensional track.

Noting Fig. 1 of the drawing, and without enumerating parts specifically, it will be observed that the entire structure can be taken down by the angler, if he wishes to do so, by the use of the simplest sort of tools, such as a screw driver.

The device forming the subject matter of this application is simple in construction but will be found thoroughly advantageous for the ends in view.

In Fig. 5, a modified form of the invention has been shown. In Fig. 5, parts hereinbefore described have been designated by numerals previously used, with the suffix $a$. In this form of the invention an offset guide or bow 68 is secured to the part 57$a$. The part 57$a$ carries a pivot element 69, on which a lever arm 84 can swing, in contact with the bow or bracket 68, the lever arm 84 being supplied at its upper end with an eye 85, corresponding to the ring 20. The structure shown in Fig. 5 of the drawing approximates the operation of the structure shown, for example in Fig. 3, but the structure shown in Fig. 3 is the more perfect form.

Having thus described the invention, what is claimed is:

1. A fishing lure comprising a body, a fish line connection, and means for mounting the connection at one end of the body for arcuate movement back and forth from each side of the body toward the other and for movement forwardly and rearwardly, said means comprising an upwardly extended bow and a forwardly extended bow having side portions crossed upon each other, the connection being mounted on the bows for movement back and forth from each side of the body toward the other and for movement forwardly and rearwardly.

2. A fishing lure comprising a body, a downwardly inclined plate-like member at the forward end of the body, a fish line connection, and means for mounting the fish line connection on said member for arcuate movement back and forth from each side of the body toward the other, and for movement forward and rearwardly, said means comprising an upwardly extended bow and a forwardly extended bow carried by said member and having side portions crossed upon each other, the connection being mounted on the bows for movement back and forth from each side of the body toward the other and for movement forwardly and rearwardly.

3. A fishing lure comprising a body, a downwardly inclined plate-like member at the forward end of the body, a fish line connection, and means for mounting the fish line connection on said member for arcuate movement back and forth from each side of the body toward the other and for movement forwardly and rearwardly, in combination with a brace secured to the plate-like member, a screw eye connecting the brace with the body, the brace having means for holding the screw eye against rotation, and a hook mounted on the screw eye.

4. A fishing lure comprising a body, a transverse track carried by the body, the track being provided with forward and rear bowed guiding edges which converge toward opposite sides of the body, and a fish line connection mounted on the track for sliding movement in contact with said edges.

5. A fishing lure comprising a body, a thimble mounted in the body, a screw eye threaded into the body and having a head engaging the thimble to hold it in the body, an angle bracket comprising arms disposed substantially at right angles to each other, one arm being a free-ended depending arm, and the other arm being secured to the body, the bracket being provided at its angle with a slot receiving the head of the screw eye, to hold the screw eye against rotation, the depending arm substantially bisecting the head, and a hook pivotally and slidably mounted on the head, on the side of the depending arm opposite to said other arm, the depending arm constituting a stop limiting the movement of the hook.

EDWARD H. BOBO.